Patented July 16, 1929.

1,720,751

UNITED STATES PATENT OFFICE.

ROGER ADAMS AND WENDELL WILLIAM MOYER, OF URBANA, ILLINOIS, ASSIGNORS TO THE NEWPORT COMPANY, OF CARROLLVILLE, WISCONSIN, A CORPORATION OF DELAWARE.

3'-NITRO-4'-ACIDYLAMIDO-O-BENZOYL-BENZOIC ACIDS AND PROCESS OF MAKING THE SAME.

No Drawing.   Application filed July 9, 1927. Serial No. 204,655.

This invention relates to 3'-nitro-4'-acidylamido-o-benzoyl-benzoic acids and to a process of making the same.

It is an object of this invention to provide a method of preparing 3'-nitro-4'-acidylamido-o-benzoyl-benzoic acids, which are valuable compounds in the preparation of dyestuff intermediates.

Other and further important objects of this invention will become apparent from the disclosures in the following description and appended claims.

In the Adams et al. Patent, No. 1,614,584, it is pointed out that derivatives of benzoyl-o-benzoic acid containing a nitro and an amino group in ortho position may be prepared by the condensation of ammonia, or primary or secondary amines with 3-nitro-4-chloro-benzoyl-o-benzoic acid.

The present invention contemplates the preparation of substituted amido compounds by the condensation of acidyl substituted ammonia compounds with 3'-nitro-4'-chloro-o-benzoyl-benzoic acid, according to the following equations, wherein R represents an aryl nucleus such as phenyl, tolyl and the like and R' represents an aryl nucleus such as phenyl, naphthyl and the like, and wherein M represents a metallic element such as sodium, hydrogen or the like:

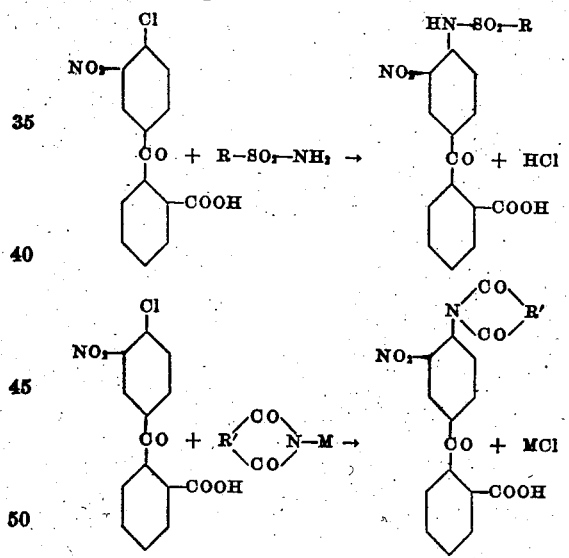

These bodies are in general crystalline solids, which may be easily recrystallized from glacial acetic acid. The melting point of 3'-nitro-4'-benzene-sulphonamido-o-benzoyl-benzoic acid is about 213° C., that of 3'-nitro-4'-(p-toluene-sulphonamido)-o-benzoyl-benzoic acid is about 229° C. with decomposition.

Without limiting our invention to any particular procedure, the following example, in which parts by weight are given, illustrates the application of our invention in the preferred form:

*Example I.*—3'-nitro-4'-(p-toluene-sulphonamido)-o-benzoyl-benzoic acid.

A mixture of 30.5 parts of 4'-chloro-3'-nitro-o-benzoyl-benzoic acid, 18.8 parts of p-toluene-sulphonamide, 30 parts of anhydrous potassium carbonate, 1.5 parts of copper acetate and 0.8 parts of copper powder are added to 200 parts of nitro benzene. The composite mixture is then heated in an oil bath to 180–190° C., under an air cooled reflux condenser with occasional shaking. The reaction apparently starts in at about 160° C. and continues with increased speed up to 180° C. Within one hour the reaction is essentially completed as evidenced by the cessation of boiling and the settling to the bottom of the flask of an orange colored solid.

The nitro-benzene is now steam distilled from the reaction mass, after which the residual solution is filtered. The product is isolated by acidifying the filtrate with dilute hydrochloric acid, whereby it is precipitated from the solution in the form of cream colored crystals. The crystals are filtered off, washed with cold water, and dried. They may be recrystallized from glacial acetic acid. The purified product has a melting point under decomposition of about 229° C., and is probably best represented by the following formula:

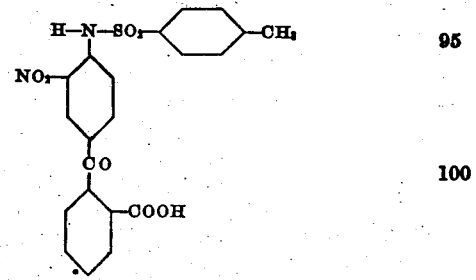

*Example II.*—3'-nitro-4'-benzene sulphonamido-o-benzoyl-benzoic acid.

Procedure as in Example I except using the molecular proportions of benzene-sulphonamide. The product has the following formula:

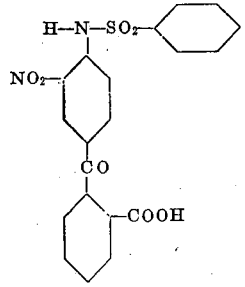

We are aware that numerous details of the process may be varied through a wide range without departing from the principles of this invention, and we therefore, do not purpose limiting the patent granted hereon, otherwise than necessitated by the prior art.

We claim as our invention:

1. The process of preparing a 3'-nitro-4'-acidylamido-o-benzoyl-benzoic acid, which comprises condensing 3'-nitro-4'-chloro-o-benzoyl-benzoic acid with an acidyl substituted ammonia.

2. The process of preparing a 3'-nitro-4'-acidylamido-o-benzoyl-benzoic acid, which comprises condensing 3'-nitro-4'-chloro-o-benzoyl-benzoic acid in nitro-benzene with an acidyl substituted ammonia in the presence of a copper catalyst.

3. The process of preparing compounds of the general formula:

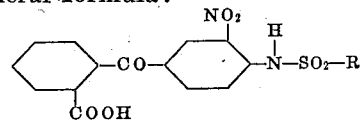

wherein R represents an aryl nucleus, which comprises condensing 3'-nitro-4'-chloro-o-benzoyl-benzoic acid in a suitable solvent with the corresponding substituted ammonia.

4. The process of preparing 3'-nitro-4'-(p-toluene-sulphonamido)-o-benzoyl-benzoic acid, which comprises condensing 3'-nitro-4'-(p-toluene-sulphonamido)-o-benzoyl-benzoic acid in nitro benzene with p-toluene-sulphonamide in the presence of a copper catalyst.

5. As new articles of manufacture, 3'-nitro-4'-acidylamido-o-benzoyl-benzoic acids.

6. As new articles of manufacture, compounds of the general formula

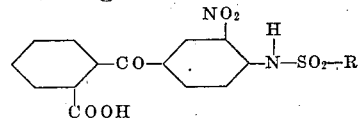

wherein R represents an aryl nucleus.

7. As a new article of manufacture, 3'-nitro-4'-(p-toluene-sulphonamido)-o-benzoyl-benzoic acid.

In testimony whereof we have hereunto subscribed our names at Urbana, Champaign County, Illinois.

ROGER ADAMS.
WENDELL WILLIAM MOYER.